Nov. 7, 1950     F. S. DEDERICH     2,528,868
CONVEYER GATE
Filed Dec. 26, 1947
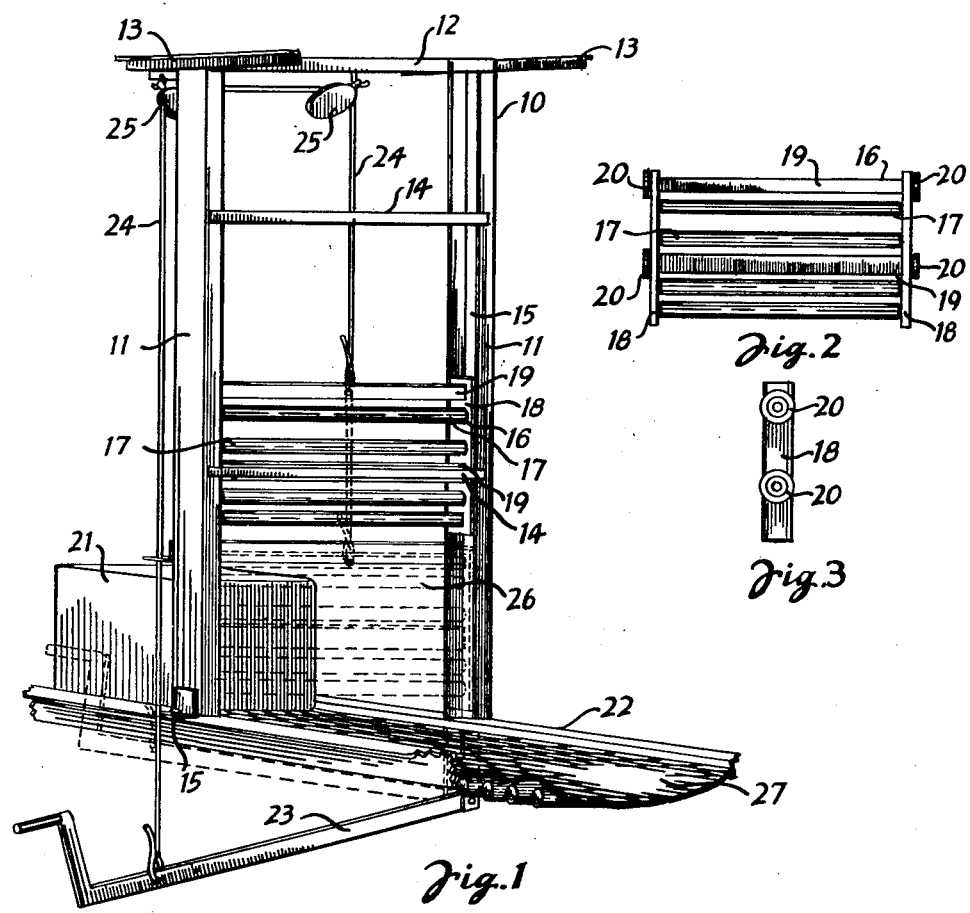
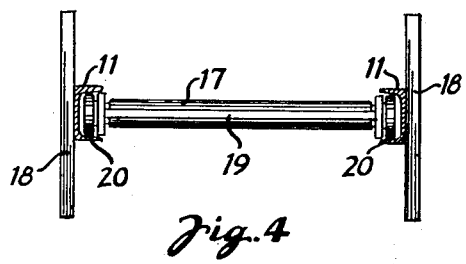
Fred S. Dederich
INVENTOR
BY Robert J. Leahy
ATTORNEY Patented Nov. 7, 1950

2,528,868

UNITED STATES PATENT OFFICE 2,528,868

CONVEYER GATE

Fred S. Dederich, Racine, Wis., assignor to S. C. Johnson & Son, Inc., Racine, Wis.

Application December 26, 1947, Serial No. 793,991

2 Claims. (Cl. 198—1)

This invention relates to a conveyor gate. More particularly, it relates to a conveyor gate serving as a halting and releasing mechanism upon the free passage for cargo along a conveyor causeway.

It is often necessary to interrupt the movement of cargo along a conveyor causeway or at its ends. For instance, when the causeway is inclined and a receiving vehicle is located at its lower end or when the causeway, along with other conveyors, acts as a tributary to a main conveyor system. It is then necessary to control the movement of the cargo from the tributary conveyors into a main conveyor causeway. Heretofore, this was attained by the use of a pole or stick positioned at the end of the causeway or place the cargo is to be halted. In installations where a stopper is used to hold back a cargo progressing along an endless belt conveyor, pressure of the cargo upon said stopper requires considerable force to remove and is very inconvenient.

An object of the present invention is to provide a stop for cargo moving upon conveyors which will operate effectively whenever the cargo is to be stopped; and may be raised with a minimum of manual labor when it is desired to allow the cargo to progress along the causeway without interference.

A further object is to provide an efficient conveyor gate particularly adapted for use with an endless conveyor which can be manufactured economically and can be operated with a minimum of effort.

Other objects of the present invention will become apparent in the course of the following specification.

In the drawing:

Figure 1 is a perspective view of the conveyor gate and a portion of the conveyor assembly.

Figure 2 is a front elevational view of the gate unit.

Figure 3 is a side elevational view of the gate unit.

Figure 4 is a top plan view of the conveyor gate with the arch top removed.

Similar numerals refer to similar parts throughout the several views.

Referring especially to Fig. 1, it will be seen that the conveyor gate 10 is made up of two channeled angle irons 11, attached to their tops to an arch top 12 having metal sleeves 13 which may be fastened, if desired, to the ceiling or a crossbeam for security. Metal crosspieces 14 give rigidity to the angle irons 11 which are affixed at their bases by means of small metal clips 15.

The gate unit 16 consists essentially of a plurality of elongated rollers 17 having their ends rotatably positioned between gate unit sides 18, and having crossbars 19 attached at their ends to said gate unit sides 18 in such a manner so as to give rigidity to the gate unit 16. A plurality of roller bearings 20 are affixed to the outer side of the gate unit sides 18. It is essential for the purpose of this invention that the periphery of the elongated rollers 17 extends beyond the gate unit sides 18, so as to provide the surface against which cargo 21 is halted as it progresses along the conveyor 22. Although the gate unit 16 illustrated in Figs. 1 and 2 contains four elongated rollers 17, it will be readily understood that the number may be varied in accordance with the particular size of the cargo handled.

The gate unit 16 is positioned within the channeled angle irons 11 by means of the roller bearings 20 which are positioned within the inside or channeled portion of the angle irons 11. A track is thus provided which allows for free movement of the gate unit 16 along the length of the angle irons 11.

The gate unit 16 is elevated by means of a handle 23 fitted at one end to the conveyor 22. A cable 24 is affixed at one end to the handle 23 and is guided by means of pulleys 25 attached, for example, to arch top 12. The other end of the cable 24 is affixed to the gate unit 16. Thus by movement of the handle 23, the gate unit 16 may be easily raised and lowered.

The gate unit 16 is placed in operating position 26 by lifting the handle 23, thus lowering the gate unit 16. Thus cargo 21, proceeding along the conveyor 22 contacts the periphery of the rollers 17 of the gate unit 16. This forms a barrier to the continued passage of the cargo 21 along the conveyor 22. The endless conveyor belt 27 continues to move undisturbed but the cargo 21 is halted until the gate unit 16 is raised. So long as the gate unit 16 remains lowered in operating position 26, all cargo, subsequently moving along the conveyor 22 will be halted.

When it is desired to release the cargo 21 which has been halted, the gate unit 16 may be easily raised by lowering the handle 23. Since only a rotatable surface has been in contact with the cargo 21, it will be readily appreciated that the effort needed to release the halted cargo 21 will be at a minimum.

Thus, in accordance with my invention, I have provided an efficient conveyor stop for cargo moving upon conveyors which can be easily operated, requiring a minimum of effort.

I wish it to be understood that I do not desire to be limited to the exact details of construction shown and described, for obvious modifications will occur to a person skilled in the art.

What is claimed is:

1. In combination an endless belt conveyor and a conveyor gate rising above and perpendicular to said belt conveyor, said gate having a plurality of rotatable rollers positioned within a framework, said framework movably positioned between a pair of vertical channeled angle irons defining the sides of said conveyor gate.

2. In combination an endless belt conveyor and a conveyor gate rising above and perpendicular to said belt conveyor, said gate having a plurality of elongated rollers rotatably mounted parallel to each other within a framework, said framework movably positioned between a pair of vertical channeled angle irons defining the sides of said conveyor gate.

FRED S. DEDERICH.

REFERENCES CITED

The following references are of record in the file of this patent:

UNITED STATES PATENTS

| Number | Name | Date |
|--------|------|------|
| 9,569 | Hall | Feb. 15, 1881 |
| 600,373 | Newell | Mar. 8, 1898 |
| 939,568 | Tice | Nov. 9, 1909 |
| 1,529,966 | Sirnit | Mar. 17, 1925 |
| 1,532,228 | Carpenter | Apr. 7, 1925 |
| 1,750,901 | Newell | Mar. 18, 1930 |
| 2,047,406 | Copping | July 14, 1936 |